(12) United States Patent
Miyata et al.

(10) Patent No.: US 7,367,322 B2
(45) Date of Patent: May 6, 2008

(54) CONTROLLER OF AN INTERNAL COMBUSTION ENGINE

(75) Inventors: Toshiyuki Miyata, Okazaki (JP); Katsunori Ueda, Okazaki (JP); Koji Kawakita, Ohbu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 62 days.

(21) Appl. No.: 11/502,478

(22) Filed: Aug. 11, 2006

(65) Prior Publication Data
US 2007/0062489 A1 Mar. 22, 2007

(30) Foreign Application Priority Data
Sep. 21, 2005 (JP) ............................. 2005-274060

(51) Int. Cl.
*F02D 41/12* (2006.01)
*F02P 5/00* (2006.01)
(52) U.S. Cl. ...................... 123/481; 123/326; 123/436; 123/406.25; 123/406.46
(58) Field of Classification Search ................ 123/481, 123/436, 305, 325–326, 332, 406.23, 406.24, 123/406.25, 406.26, 406.45, 406.46, 406.47, 123/406.5, 406.51, 492–493; 60/285
See application file for complete search history.

(56) References Cited

U.S. PATENT DOCUMENTS

| 5,642,705 A | * | 7/1997 | Morikawa et al. .......... 123/300 |
| 2004/0237935 A1 | * | 12/2004 | Fukusako et al. ...... 123/406.47 |

FOREIGN PATENT DOCUMENTS

| DE | 27 27 804 A1 | | 1/1979 |
| DE | 27 38 886 A1 | | 3/1979 |
| DE | 42 36 922 A1 | | 5/1994 |
| DE | 43 34 571 A1 | | 4/1995 |
| EP | 0241008 | * | 10/2007 |
| JP | 6-288327 A | | 10/1994 |
| JP | 2003-254126 A | | 9/2003 |

* cited by examiner

*Primary Examiner*—Hai Huynh
(74) *Attorney, Agent, or Firm*—Birch, Stewart, Kolasch & Birch, LLP

(57) ABSTRACT

When the first fuel injection is performed after reversion from the fuel cut, the fuel pulse width Ka·INJ.PW is set so that a fuel supply amount is greatly increased in relation to an intake air amount, and the ignition timing is set to the first retarded ignition timing θa. When the second and subsequent fuel injections are performed, the fuel pulse width Kb·INJ.PW that is smaller in increase width of fuel is set, and the ignition timing is set to the second retarded ignition timing θb that has a retardation amount smaller than that of the first retarded ignition timing θa.

7 Claims, 4 Drawing Sheets

CONTROLLER OF AN INTERNAL COMBUSTION ENGINE

BACKGROUND OF THE INVENTION

1. Field of the Invention

The present invention relates to a controller of an internal combustion engine, and more specifically to the control that is implemented when fuel cut is finished to restart fuel supply in an internal combustion engine.

2. Description of the Related Art

In recent years, it is widely known to stop fuel supply to each cylinder of an internal combustion engine, that is, to perform so-called fuel cut, at the time of deceleration or the like of a vehicle. During fuel cut, combustion is not produced in engine cylinders, and the fresh air sucked in by the engine flows directly through an exhaust passage into an exhaust gas purification catalyst. Therefore, a large quantity of oxygen is adsorbed on the exhaust gas purification catalyst.

By the time the engine returns from a fuel cut condition to a fuel supply condition, the exhaust gas purification performance is degraded due to the adsorption of a large quantity of oxygen on the exhaust gas purification catalyst. This causes the problem that the discharge amount of NOx (nitrogen oxides) into the atmosphere is increased. There generates another problem that, shortly after reversion from fuel cut, the brake horsepower of the engine is suddenly changed to cause shock.

In respect of the former problem, there has been developed the technology of early consuming the oxygen adsorbed on the exhaust gas purification catalyst by increasing compensation amount of a fuel injection amount to set an exhaust gas air-fuel ratio to the vicinity of a stoichiometric air-fuel ratio in the time period from the reversion from fuel cut to the implementation of air-fuel ratio feedback control. This technology is disclosed, for example, in Unexamined Japanese Patent Application Publication No. 2003-254126 (hereinafter, referred to as Patent Document 1).

As to the latter problem, there has been developed the technology of preventing shock by reducing an intake air amount and retarding the ignition timing at the time of reversion from fuel cut. This technology is disclosed, for example, in Unexamined Japanese Patent Application Publication No. 6-288327 (hereinafter, referred to as Patent Document 2).

The technology disclosed in Patent Document 1, however, has not been developed in consideration of the shock that is caused along with the reversion from fuel cut.

According to the technology disclosed in Patent Document 2, the misfire limit of ignition timing retardation in normal control of the internal combustion engine is at around zero degree BTDC. For this reason, even if the ignition timing is retarded to the misfire limit, it is hard to reduce the shock sufficiently. In addition, there are problems including one that, since the oxygen adsorption on the exhaust gas purification catalyst during fuel cut is not taken into account, the discharge amount of NOx into the atmosphere is increased, which is an undesirable condition.

SUMMARY OF THE INVENTION

An aspect of the present invention is a controller of an internal combustion engine capable of carrying out fuel cut to stop fuel supply into each cylinder, the controller comprising: an exhaust gas purification catalyst interposed in an exhaust passage for purifying exhaust gas; air-fuel ratio control means for controlling an in-cylinder air-fuel ratio of each cylinder; and ignition timing control means for controlling ignition timing of each cylinder, wherein the air-fuel ratio control means increases a fuel injection amount at a first increase rate, during a first prescribed period corresponding to a period from a time point of end of the fuel cut to a time point of start of first fuel supply with respect to each cylinder, in relation to a basic fuel injection amount that is set based upon an operation state of the internal combustion engine, and increases the fuel injection amount at a second increase rate that is lower than the first increase rate, during a second prescribed period following the first prescribed period, in relation to the basic fuel injection amount; and the ignition timing control means controls ignition timing with respect to the fuel supplied during the first prescribed period to be first retarded ignition timing that is more retarded than reference ignition timing that is set based upon the operation state of the internal combustion engine, and controls ignition timing with respect to the fuel supplied during the second prescribed period to be second retarded ignition timing that is more retarded than the reference ignition timing and more advanced than the first retarded ignition timing.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Embodiments of the present invention will be described below with reference to the attached drawings.

Figure 1:
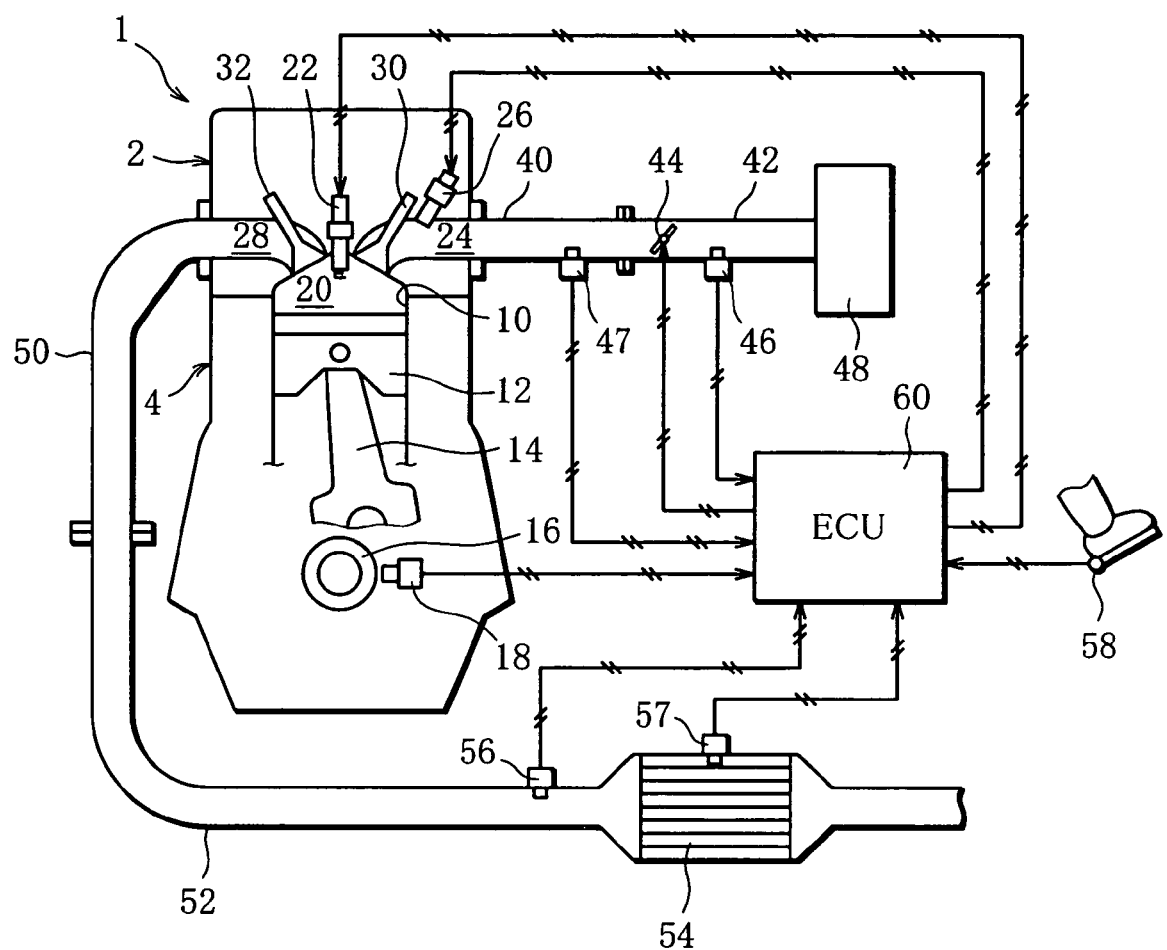
FIG. 1 is a schematic construction view of a controller of an internal combustion engine according to one embodiment of the present invention.

FIG. 1 is a schematic construction view of a controller of an internal combustion engine according to one embodiment of the present invention.

An engine 1 (internal combustion engine) is an intake port injection type four-stroke in-line four-cylinder engine, which is constructed of four cylinders arranged in series and performs fuel ignition at each regular intervals of 180 degrees crank angle. FIG. 1 shows a vertical sectional view of one of the cylinders. Illustration and descriptions of the other cylinders will be omitted as they have an identical construction, and one cylinder will be representatively described here.

As illustrated in FIG. 1, the engine 1 is constructed so that a cylinder head 4 is mounted on a cylinder block 2. A piston 12 is inserted into a cylinder 10 formed in the cylinder block 2 so as to be vertically slidable. The piston 12 is connected to a crank shaft 16 through a connecting rod 14. The crank shaft 16 is provided with a crank angle sensor 18 for detecting crank angle.

A combustion chamber 20 is formed of the cylinder head 2, the cylinder 10 and the piston 12. An ignition plug 22 is disposed in the cylinder head 2 so that an electrode portion is exposed into the combustion chamber 20.

In the cylinder head 2, there is formed an intake port 24 that communicates with the combustion chamber 20 and extends on one side of the engine 1 in width direction. A fuel injector 26 that injects fuel into the intake port 24 is disposed so that the fuel injector 26 is partially exposed into the intake port 24. The fuel injector 26 carries out the fuel injection toward the inside of the intake port 24 according to pulse width of the fuel injection in signals supplied to the fuel injector 24.

In the cylinder head 2, there is also formed an exhaust port 28 that communicates with the combustion chamber 20 and extends on the other side of the engine 1 in width direction.

Further disposed in the cylinder head 2 are an intake valve 30 that performs communication/disconnection between the combustion chamber 20 and the intake port 24, and an exhaust valve 32 that performs communication/disconnection between the combustion chamber 20 and the exhaust port 28.

An intake manifold 40 is connected to the one width-directional side of the engine 1 so as to communicate with the intake port 24. An intake pipe 42 is connected to an upstream-side end of the intake manifold 40.

A throttle valve 44 for adjusting an intake air amount of the engine 1 is disposed in the intake pipe 42. Arranged in the upstream of the throttle valve 44 is an air flow sensor (AFS) 46 for detecting the intake air amount. In the downstream of the throttle valve 44, there is provided an intake pressure sensor 47 for detecting pressure in the intake manifold 40 (intake manifold pressure). An air cleaner 48 is disposed in an end of the intake pipe 42.

An exhaust manifold 50 is connected to the other width-directional side of the engine 1 so as to communicate with the exhaust port 28. An exhaust pipe 52 is connected to the downstream-side end of the exhaust manifold 50.

An exhaust gas purification catalyst 54 is disposed in the downstream of the exhaust pipe 52. The exhaust gas purification catalyst 54 is, for example, a three way catalyst having a function for oxidizing hydrocarbon and carbon monoxide, and reducing NOx. The three way catalyst contains noble metal such as Pt (platinum). The noble metal has a property of adsorbing oxygen if oxidizing atmosphere continues and being degraded in NOx purification performance. An exhaust gas sensor 56 for detecting oxygen concentration in exhaust gas is arranged in the upstream of an exhaust gas purification device 54.

In a vehicle equipped with the engine 1, there is disposed an accelerator position sensor (hereinafter, referred to as APS) 58 for detecting an operation amount of an accelerator, that is, accelerator depression angle.

Various kinds of devices and sensors, including the APS 58, the crank angle sensor 18, the ignition plugs 22, the fuel injectors 26, the throttle valve 44, the AFS 46, the exhaust gas sensor 56, etc., are electrically connected to an ECU (electrical control unit) 60 (the air-fuel ratio control means and the ignition timing control means). The ECU 60 controls operations of the various devices according to information from the various sensors.

Specifically, in the engine 1, it is possible to perform so-called fuel cut that stops fuel supply to the engine 1 at the time of deceleration of the vehicle and the like. The ECU 60 has a function of implementing the air-fuel ratio control and the ignition timing control of the engine 1 at the time of reversion to a condition in which the fuel is supplied to the engine 1 again to accelerate the vehicle or the like.

Figure 2:
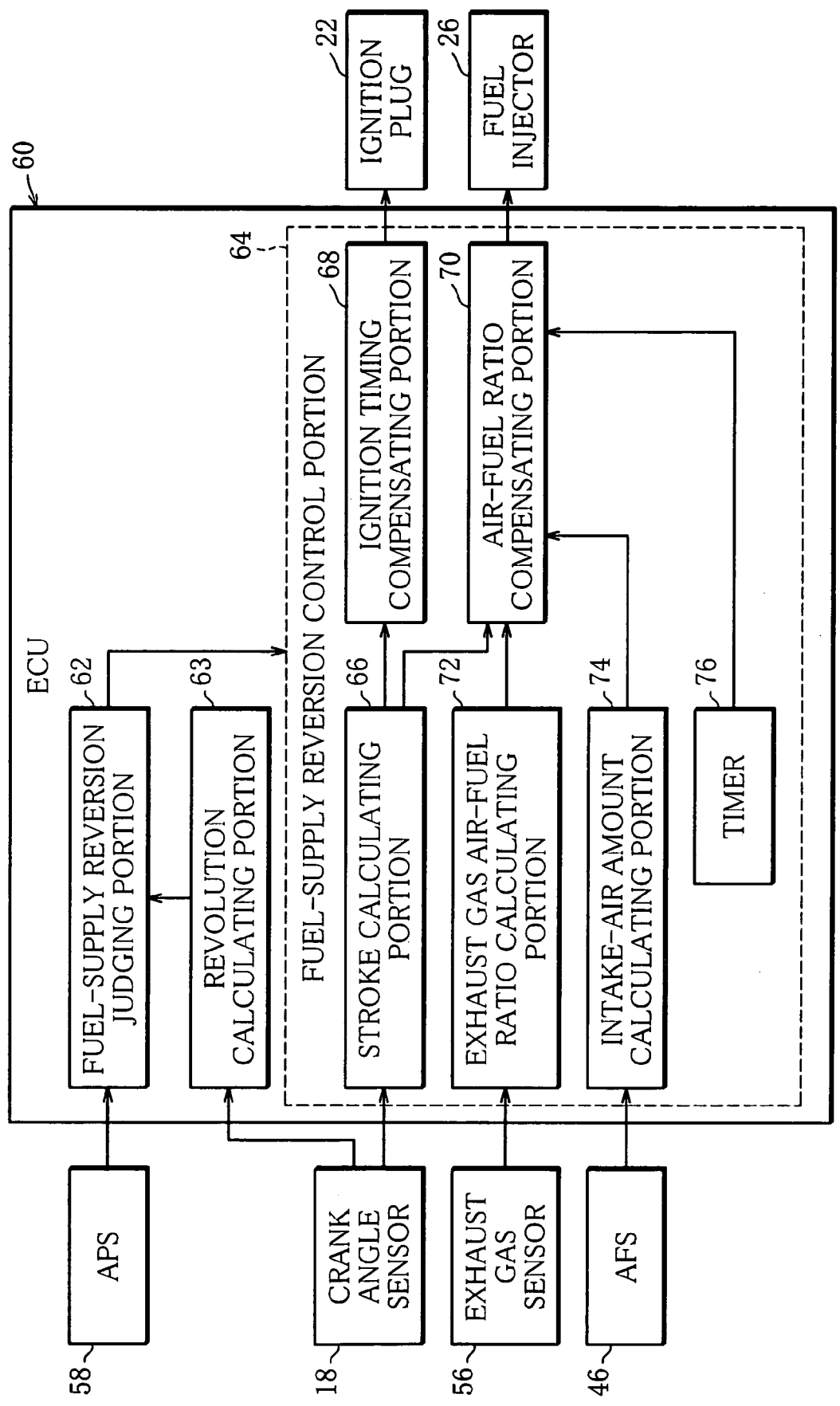
FIG. 2 is a block diagram showing an internal structure of an ECU in the controller of FIG. 1.

To be concrete, FIG. 2 shows a block diagram of an internal structure of the ECU 60, and input/output relationship of the ECU 60 will be explained below with reference to FIG. 2.

Accelerator depression angle data that is detected by the APS 58 is supplied to a fuel-supply reversion judging portion 62 disposed in the ECU 60. Engine revolution information that is calculated by a revolution calculating portion 63 based on output of the crank angle sensor 18 is supplied to the fuel-supply reversion judging portion 62. Based upon the accelerator depression angle data and the engine revolution information, the fuel-supply reversion judging portion 62 makes a judgment as to whether the engine 1 returns from a fuel cut condition to the fuel supply condition (hereinafter, occasionally referred to as reversion from the fuel cut). For example, when a press on the accelerator is released and the accelerator depression angle becomes zero at an engine revolution equal to or more than prescribed revolution, a fuel cut flag is turned ON. In such a state, if the accelerator is pressed again, and the accelerator depression angle grows larger, or if the engine revolution is reduced to less than the prescribe revolution, the fuel cut flag is turned OFF and it is judged as reversion from the fuel cut.

When the reversion from the fuel cut is judged by the fuel-supply reversion judging portion 62, the fuel-supply reversion judging portion 62 outputs to a fuel-supply reversion control portion 64, data of a result of the fuel-supply reversion judgment indicative that the engine 1 returns from the fuel cut condition to the fuel supply condition.

Once the result of the fuel-supply reversion judgment is supplied to the fuel-supply reversion control portion 64, crank angle data that is detected by the crank angle sensor 18 is first fed to a stroke calculating portion 66. The stroke calculating portion 66, based upon the crank angle data, calculates the number of strokes of the engine 1 from a time point of the reversion from the fuel cut. The stroke data that is calculated by the stroke calculating portion 66 is supplied to an ignition timing compensating portion 68 (ignition timing control means) and an air-fuel ratio compensating portion 70 (air-fuel ratio control means) arranged in the fuel-supply reversion control portion 64.

Data of oxygen concentration in exhaust gas that is detected by the exhaust gas sensor 56 and intake air amount data that is detected by the AFS 46 are supplied to an exhaust gas air-fuel ratio calculating portion 72 and an intake-air amount calculating portion 74 arranged in the fuel-supply reversion control portion 64. The exhaust gas air-fuel ratio calculating portion 72 calculates an exhaust gas air-fuel ratio on the basis of the oxygen concentration in the exhaust gas. The intake-air amount calculating portion 74 calculates an air amount that is sucked into each cylinder, on the basis of the intake air amount data. The exhaust gas air-fuel ratio data and the data of the intake air amount into each cylinder are supplied to the air-fuel ratio compensating portion 70.

Furthermore, a timer 76 is disposed in the fuel-supply reversion control portion 64. The timer 76 detects elapsed time (or the number of strokes) from the time point of reversion from the fuel cut. Data of the elapsed time (or the number of strokes) is also supplied to the air-fuel ratio compensating portion 70. The air-fuel ratio compensating portion 70 is provided with a counter for determining that the elapsed time (or the number of strokes) reaches prescribed time (or prescribed number of strokes).

The ignition timing compensating portion 68 to which the various kinds of data is supplied as described above compensates the ignition timing at the time of reversion from the fuel cut according to the various kinds of data, and outputs to the ignition plug 22 an ignition signal corresponding to the ignition timing that has been compensated. The air-fuel ratio compensating portion 70 compensates the air-fuel ratio in the cylinder at the time of reversion from the fuel cut according to the various kinds of data that has been supplied, and outputs a fuel injection pulse signal corresponding to the compensated air-fuel ratio to the fuel injector 26.

Operation of the controller of an internal combustion engine according to the present embodiment thus constructed will be described below.

Figure 3:
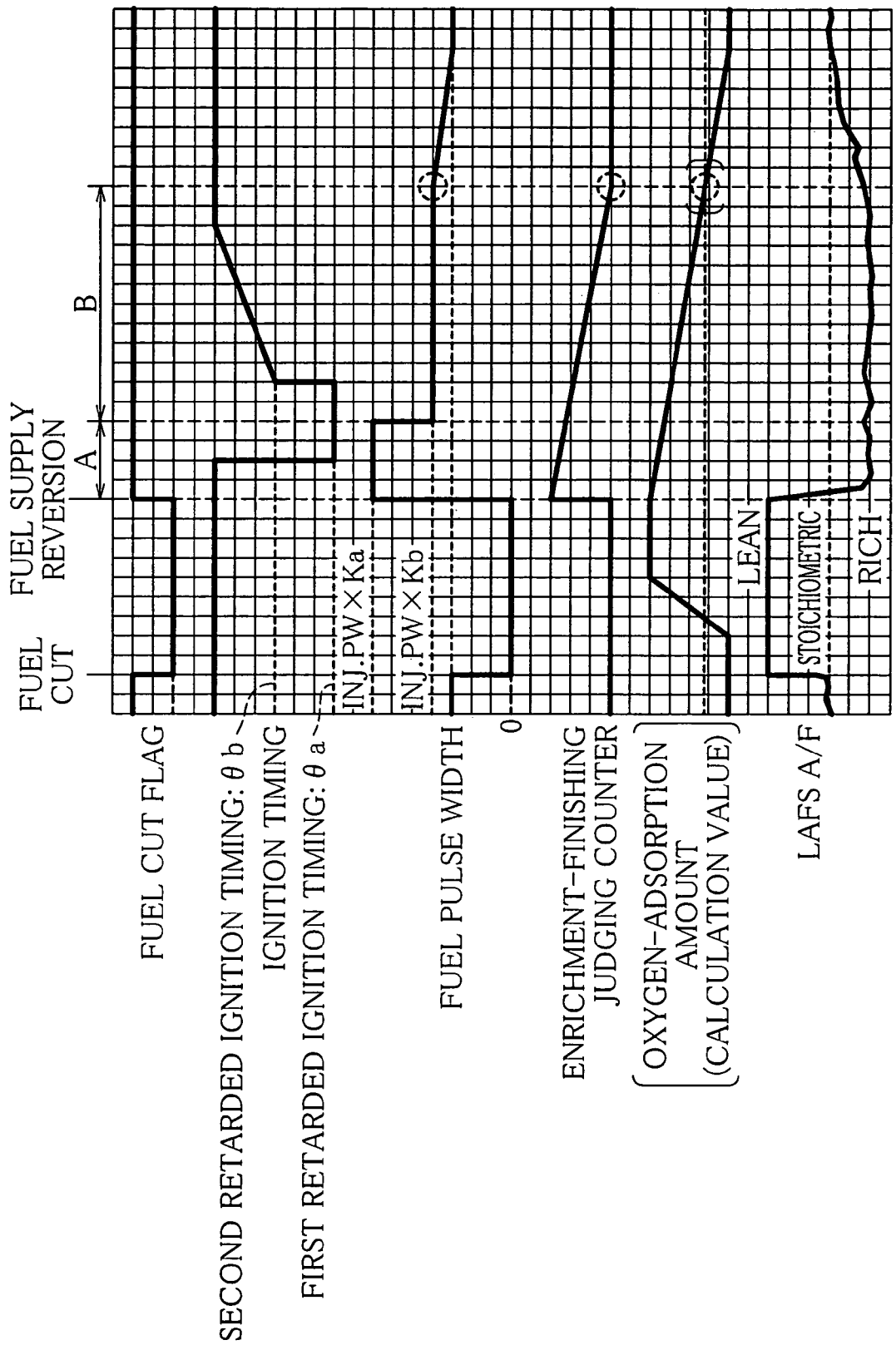
FIG. 3 is a time chart chronologically showing various states of an engine 1 at the time of fuel supply reversion control that is implemented by the controller of FIG. 1.

FIG. 3 is a time chart chronologically showing various states of the engine 1 at the time of fuel supply reversion control that is implemented by the controller. The description will be provided below with reference to FIG. 3.

First, when the fuel cut flag is switched from ON to OFF, that is, when the engine 1 returns from the fuel cut condition to the fuel supply condition, the fuel-supply reversion judging portion 62 disposed in the ECU 60 determines this as reversion from the fuel cut, and the fuel-supply reversion control portion 64 implements the fuel supply reversion control.

Specifically, the stroke calculating portion 66 and the timer 76 start counting the number of strokes of the engine 1 and the elapsed time from the time point of reversion from the fuel cut.

During a time period when first fuel injection to each cylinder after the reversion from the fuel cut is carried out, that is, during first prescribed period A corresponding to first four strokes, the air-fuel ratio compensating portion 70 sets a pulse width of the fuel injection so that a fuel supply amount markedly increases in relation to the intake air amount, and outputs the fuel injection pulse signal having this pulse width to the fuel injector 26.

To be more specific, the pulse width of the fuel injection at this moment is a pulse width ka·INJ.PW obtained by multiplying a pulse width INJ.PW serving as a base according to the intake air amount (for example, a pulse width corresponding to a fuel injection amount forming stoichiometric air-fuel ratio) by a first rich coefficient Ka (first increase rate) that is set to a relatively high value in consideration of the fact that the cylinder is filled with fresh air.

Figure 4:
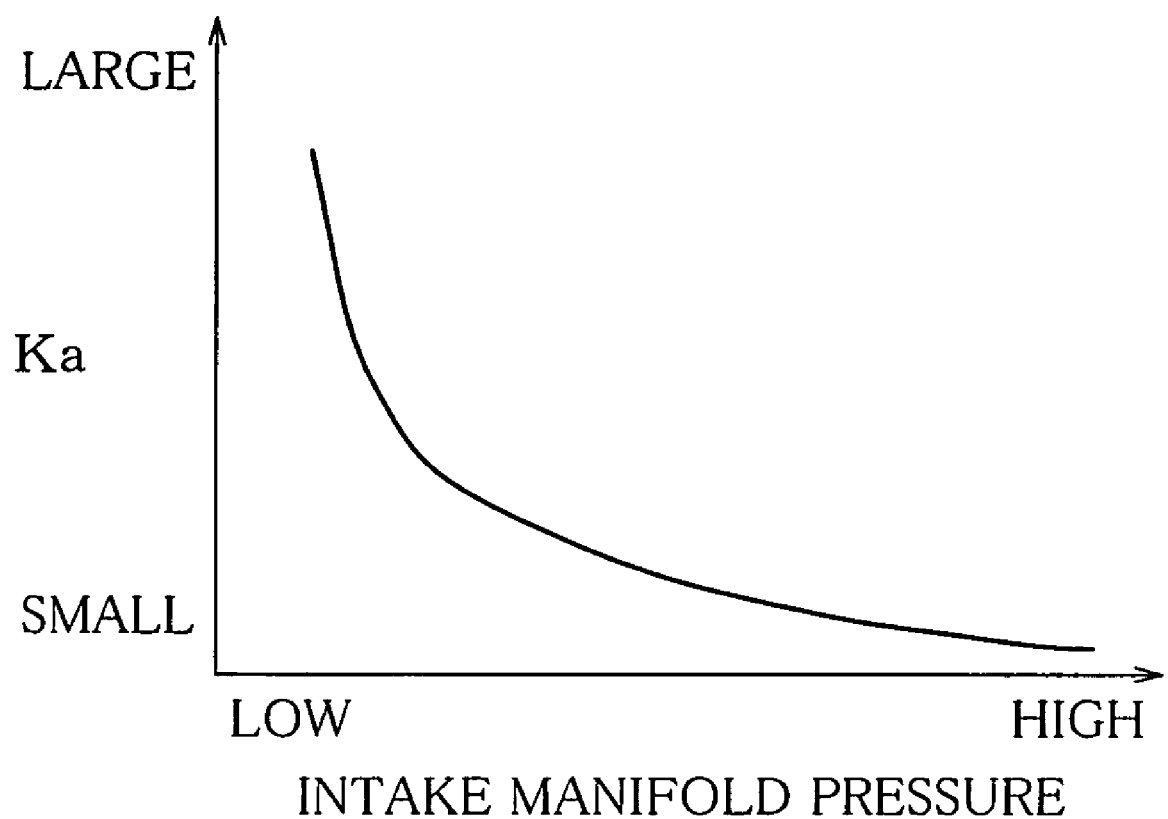
FIG. 4 is a characteristic graph of a first rich coefficient Ka that is used in the controller of FIG. 1.

The fuel injection carried out with the pulse width Ka·INJ.PW makes it possible to realize the fuel injection in which a fuel injection amount is much higher than the fuel injection amount corresponding to a stoichiometric air-fuel ratio according to the intake air amount. The first rich coefficient Ka has a property of being increased as an intake manifold pressure lowers at the time of reversion from the fuel cut as illustrated in FIG. 4, so that the first rich coefficient Ka is properly varied in accordance to an in-cylinder fresh-air amount that is changed by the intake manifold pressure.

The ignition timing compensating portion 68 sets the ignition timing of ignition with respect to an air-fuel mixture enriched by the first rich coefficient Ka, that is, the ignition timing of ignition from third stroke to sixth stroke after the reversion from the fuel cut, to a first retarded ignition timing θa, and outputs an ignition signal according to the first retarded ignition timing θa to the ignition plug 22. In consideration of the fact that the air-fuel mixture to be ignited is greatly increased in fuel, the first retarded ignition timing θa is retarded to such ignition timing that there occurs a misfire at an air-fuel ratio that is set on the basis of a normal operation state (for example, 20 degrees ATDC to 30 degrees ATDC).

As to second fuel injection for each cylinder, or fuel injection during a second prescribed period B from fifth stroke, the air-fuel ratio compensating portion 70 increases a fuel injection amount to higher than a fuel supply amount according to the intake air amount, and sets a fuel injection pulse width that is compensated to be increased at a lower increase rate than that in the first prescribed period A. In other words, after the reversion from the fuel cut, when first combustion is generated in each cylinder, there exists remaining unburned gas in the cylinder as in the normal operation state. Therefore, if the fuel injection amount is increased with the first rich coefficient Ka unchanged, there causes an overrich condition. For this reason, the pulse width of the fuel injection in the second prescribed period B is set to a pulse Kb·INJ.PW obtained by multiplying a second rich coefficient Kb (second increase rate) that is a value smaller than the first rich coefficient Ka by a base pulse width INJ.PW, on the basis of a misfire limit of ignition timing retardation at the time when the remaining unburned gas exits in the cylinder. As is clear from FIG. 3, an amount of the fuel increase in the first prescribed period A is twice or more than an amount of the fuel increase in the second prescribed period B.

As to the ignition with respect to an air-fuel mixture that is enriched by the second rich coefficient Kb, or ignition of seventh and subsequent strokes after the reversion from the fuel cut, the ignition timing compensating portion 68 first sets ignition timing of seventh ignition to second retarded ignition timing θb that is more retarded than the ignition timing during the normal operation but more advanced than the first prescribed retarded ignition timing θa. To be concrete, the second retarded ignition timing θb is set to the ignition timing that is so retarded as not to exceed the misfire limit of ignition timing retardation according to the second rich coefficient Kb (for example, 10 degrees ATDC to 0 degree BTDC).

As to eighth and subsequent strokes, ignition timing is gradually advanced at prescribed gain from the second retarded ignition timing θb toward reference ignition timing.

If it is determined that the elapsed time (or the number of strokes) that is counted by the timer 76 reaches the prescribed time in the counter of the air-fuel ratio compensating portion 70, the air-fuel ratio compensating portion 70 determines that timing for finishing enrichment is reached, and gradually reduces the amount of the fuel increase at prescribed tailing gain in order to finish the enrichment of the air-fuel ratio, thereby leaning the air-fuel ratio toward the stoichiometric air-fuel ratio by degrees.

It is possible, instead of using the timer 76, to provide an exhaust gas sensor 57 to an exhaust gas purification catalyst 54, monitor a state of oxygen adsorption onto the exhaust gas purification catalyst 54 by use of the exhaust gas sensor 57, and start the leaning with an output of the exhaust gas sensor 57 as a trigger.

It is also possible to so control as to figure out an oxygen amount that is adsorbed on the exhaust gas purification catalyst 54 by calculating a changed amount of the exhaust gas air-fuel ratio and an air amount that passes through the exhaust gas purification catalyst 54 by means of the exhaust gas sensor 56 and the AFS 46 and by multiplying the exhaust gas air-fuel ratio changed amount and the catalyst passing air amount, and to start the leaning of the air-fuel ratio with a time point when the oxygen adsorption amount is reduced to equal to or less than a prescribed amount as enrichment finishing timing. In this case, according to the present embodiment, the oxygen amount that is adsorbed onto the exhaust gas purification catalyst 54 is calculated in the ECU 60. Therefore, the ECU 60 corresponds to oxygen-adsorption amount estimation means of the present invention.

The enrichment finishing timing may be decided according to both the timer 76 and the calculated oxygen adsorption amount. If the enrichment finishing timing is set according to the oxygen adsorption amount in this manner, the enrichment can be completed with more proper timing.

In case that the engine returns from the fuel cut condition to the fuel supply condition, since the engine is in the fuel cut condition immediately before the first prescribed period A, there exists no remaining unburned gas but only fresh air in each cylinder in the first prescribed period A. Accordingly, if the fuel supply amount is greatly increased in relation to the intake air amount as stated, the exhausts air-fuel ratio can be enriched to a great degree immediately after the fuel cut is finished while suppressing an increase in the discharge amount of hydrocarbon into the atmosphere. By the substantial enrichment of the exhaust gas air-fuel ratio immediately after the finish of the fuel cut, the oxygen that has adsorbed onto the exhaust gas purification catalyst during the fuel cut can be promptly consumed while discharge of NOx is suppressed, which efficiently prevents the increase of the discharge amount of NOx into the atmosphere.

The substantial fuel increase in the first prescribed period A shifts the misfire limit in a retardation direction, which expand an area in which no misfire occurs. This makes it possible to retard the ignition timing to the first retarded ignition timing θa that normally causes a misfire. If the ignition timing is drastically retarded as described above, it is possible to prevent a sudden change in shaft output at the time of the reversion from the fuel cut, to thereby reduce shock.

In the second prescribed period B where there exists the remaining unburned gas in each cylinder, if the fuel is increased at a lower increase rate than that in the first prescribed period A, it is possible to suppress an increase in the discharge amount of HC into the atmosphere while maintaining the enrichment of the exhaust gas air-fuel ratio, and then to keep suppressing the discharge of NOx into the atmosphere. In the second prescribed period B, the ignition timing is set to the second retarded ignition timing θb that is more advanced than the first retarded ignition timing θa, and is then advanced in stages. This makes it possible to efficiently actualize the reduction of the shock while preventing a misfire at the same time.

Furthermore, if the in-cylinder air-fuel ratio is gradually leaned from a time point when the second prescribed period B is over, the timing when the ignition timing is gradually advanced and the timing when the air-fuel ratio is gradually leaned are staggered from each other, and the shock can be reduced more effectively.

As described above, the controller of an internal combustion engine according to the present embodiment is capable of efficiently suppressing the increase of the discharge amount of NOx into the atmosphere at the time of reversion from the fuel cut, and of reducing the shock caused at the time of the reversion from the fuel cut.

The description of the controller of an internal combustion engine according to the one embodiment of the present invention is finished here, but an aspect of the embodiment is not limited to the foregoing embodiment.

For example, in the above embodiment, the fuel-supply reversion judgment is made according to the information from the APS 58 or engine revolution information, and the calculation of the number of strokes is carried out based on the information from the crank angle sensor 18. The calculation of the exhaust gas air-fuel ratio is performed based on the information from the exhaust sensor 56, and the calculation of the intake air amount is made based on the information from the AFS 46. However, these judgment and calculations may be carried out according to information from the other means.

Although the engine 1 is a manifold injection-type engine in the above embodiment, the engine is not limited thereto, but may be, for example, an in-cylinder injection type engine.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A controller of an internal combustion engine capable of carrying out fuel cut and stopping fuel supply into each cylinder, said controller comprising:
    an exhaust gas purification catalyst interposed in an exhaust passage for purifying exhaust gas;
    air-fuel ratio control means for controlling an in-cylinder air-fuel ratio of each cylinder; and
    ignition timing control means for controlling ignition timing of each cylinder, wherein:
    said air-fuel ratio control means increases a fuel injection amount at a first increase rate, during a first prescribed period corresponding to a period from a time point of end of said fuel cut to a time point of start of first fuel supply with respect to each cylinder, in relation to a basic fuel injection amount that is set based upon an operation state of said internal combustion engine, and increases the fuel injection amount at a second increase rate that is lower than said first increase rate, during a second prescribed period following said first prescribed period, in relation to said basic fuel injection amount; and
    said ignition timing control means controls ignition timing with respect to the fuel supplied during said first prescribed period to be first retarded ignition timing that is more retarded than reference ignition timing that is set based upon the operation state of said internal combustion engine, and controls ignition timing with respect to the fuel supplied during said second prescribed period to be second retarded ignition timing that is more retarded than said reference ignition timing and more advanced than said first retarded ignition timing.

2. The controller of an internal combustion engine according to claim 1, wherein:
    the lower an intake manifold pressure at the time point of the end of said fuel cut is, the higher said first increase rate is set.

3. The controller of an internal combustion engine according to claim 1, wherein:
    said ignition timing control means sets the ignition timing with respect to the fuel supplied during said second prescribed period to said second retarded ignition timing and thereafter gradually advances the ignition timing toward said reference ignition timing.

4. The controller of an internal combustion engine according to claim 3, wherein:
    said air-fuel ratio control means gradually reduces a fuel injection amount of said each cylinder toward said basic fuel injection amount, immediately after the end of said second prescribed period.

5. The controller of an internal combustion engine according to claim 1, further comprising:

oxygen-adsorption amount estimation means for estimating an adsorption amount of oxygen that is adsorbed on said exhaust gas purification catalyst, wherein:

said second prescribed period ends at a time point when the oxygen-adsorption amount that is estimated by said oxygen-adsorption amount estimation means is reduced to equal to or less than a prescribed amount.

6. The controller of an internal combustion engine according to claim 1, wherein:

a fuel increase amount based upon said first increase rate is twice or more than a fuel increase amount based upon said second increase rate.

7. The controller of an internal combustion engine according to claim 1, wherein:

said basic fuel injection amount is an injection amount corresponding to a stoichiometric air-fuel ratio.

* * * * *